United States Patent
Da Silva et al.

(10) Patent No.: US 11,994,179 B2
(45) Date of Patent: May 28, 2024

(54) CORRECTING AN IMBALANCE IN A ROTATING SHAFT

(71) Applicant: Dana Automotive Systems Group, LLC, Maumee, OH (US)

(72) Inventors: Jose P. Da Silva, Maumee, OH (US); Asier Vega, Tolosa (ES)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 905 days.

(21) Appl. No.: 16/982,993

(22) PCT Filed: Mar. 13, 2019

(86) PCT No.: PCT/US2019/022041
§ 371 (c)(1),
(2) Date: Sep. 21, 2020

(87) PCT Pub. No.: WO2019/182832
PCT Pub. Date: Sep. 26, 2019

(65) Prior Publication Data
US 2021/0025456 A1   Jan. 28, 2021

Related U.S. Application Data

(60) Provisional application No. 62/647,276, filed on Mar. 23, 2018.

(51) Int. Cl.
*F16D 3/223* (2011.01)
*F16D 1/068* (2006.01)
(Continued)

(52) U.S. Cl.
CPC ............. *F16D 3/223* (2013.01); *F16D 1/068* (2013.01); *F16F 15/322* (2013.01); *F16F 15/34* (2013.01);
(Continued)

(58) Field of Classification Search
CPC . F16D 3/223; F16D 3/84; F16D 3/843; F16D 3/845; F16D 2003/22316;
(Continued)

(56) References Cited

U.S. PATENT DOCUMENTS 3,940,948 A   3/1976  Schultenkamper
5,026,323 A * 6/1991  Fukumura ............... F16D 3/845
                                              464/175

(Continued)

FOREIGN PATENT DOCUMENTS

JP    S60211115 A    10/1985
JP    3685847 B2     6/2005
JP    3685847 B2 *  8/2005  ............. F16F 15/34

OTHER PUBLICATIONS

ISA European Patent Office, International Search Report Issued in Application No. PCT/US2019/022041, dated May 28, 2020, WIPO, 2 pages.

*Primary Examiner* — Josh Skroupa
(74) *Attorney, Agent, or Firm* — McCoy Russell LLP

(57) ABSTRACT

An apparatus for correcting an imbalance in a rotating shaft and a method for correcting the imbalance in a rotating shaft. The joint assembly includes a first joint member that is drivingly connected to at least a portion of second joint member via one or more torque transmission elements. At least a portion of a first shaft is drivingly connected to at least a portion of a first joint member and at least a portion of a second shaft is drivingly connected to at least a portion of a second end portion of the second joint member. A boot can is connected to at least a portion of a first end portion of the second joint member and one or more balancing elements are attached to at least a portion of the boot can.

21 Claims, 6 Drawing Sheets

(51) Int. Cl.
  *F16F 15/32* (2006.01)
  *F16F 15/34* (2006.01)
(52) U.S. Cl.
  CPC .............. *F16D 2003/22316* (2013.01); *F16D 2003/22326* (2013.01)
(58) Field of Classification Search
  CPC .............. F16D 2300/00; F16D 2300/22; F16F 15/322; F16F 15/34; Y10S 464/904–906; Y10T 464/50
  USPC ................ 464/170, 173–175, 180, 904–906
  See application file for complete search history.

(56) References Cited

U.S. PATENT DOCUMENTS

| | | |
|---|---|---|
| 5,297,996 A | 3/1994 | Draga |
| 6,238,006 B1 * | 5/2001 | Manojlovic ........... F16F 15/324 |
| | | 301/5.21 |
| 6,579,187 B2 | 6/2003 | Ramey |
| 6,773,354 B2 | 8/2004 | Marriott et al. |
| 6,826,817 B1 | 12/2004 | Rapp |
| 7,377,749 B2 * | 5/2008 | Charrier .................. F16F 15/34 |
| | | 416/119 |
| 8,328,650 B2 | 12/2012 | Takabe |
| 8,459,147 B2 * | 6/2013 | Harada ................... F16F 15/34 |
| | | 74/572.4 |
| 8,506,253 B2 * | 8/2013 | Lecuyer .................. F01D 5/027 |
| | | 416/145 |
| 8,784,220 B1 * | 7/2014 | Katke ..................... F16D 3/223 |
| | | 464/173 |
| 8,807,663 B2 * | 8/2014 | Prevost ................. F16F 15/324 |
| | | 301/5.21 |
| 8,888,458 B2 * | 11/2014 | Billings ................. F16F 15/34 |
| | | 416/144 |
| 9,670,964 B1 | 6/2017 | Burnard et al. |
| 2003/0050127 A1 | 3/2003 | Barrett et al. |
| 2003/0050128 A1 | 3/2003 | Marriott et al. |
| 2003/0227138 A1 * | 12/2003 | Schneider ............... F16D 3/845 |
| | | 277/391 |
| 2018/0051771 A1 * | 2/2018 | Nijakowski ........... F16F 15/322 |

* cited by examiner

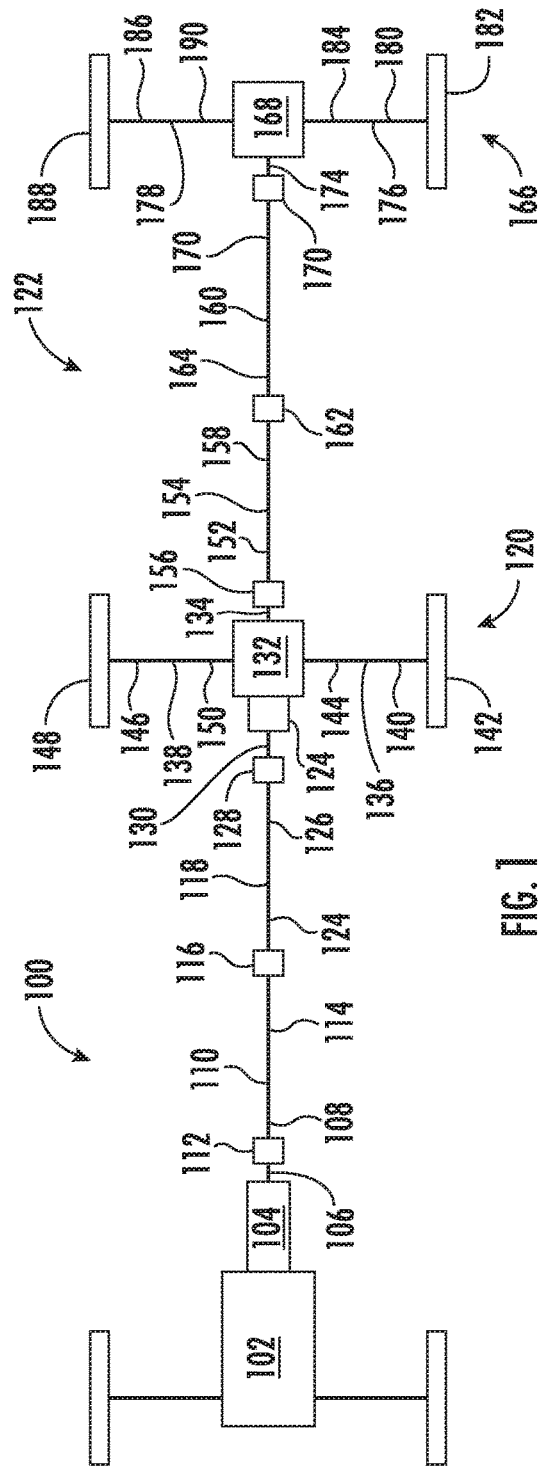
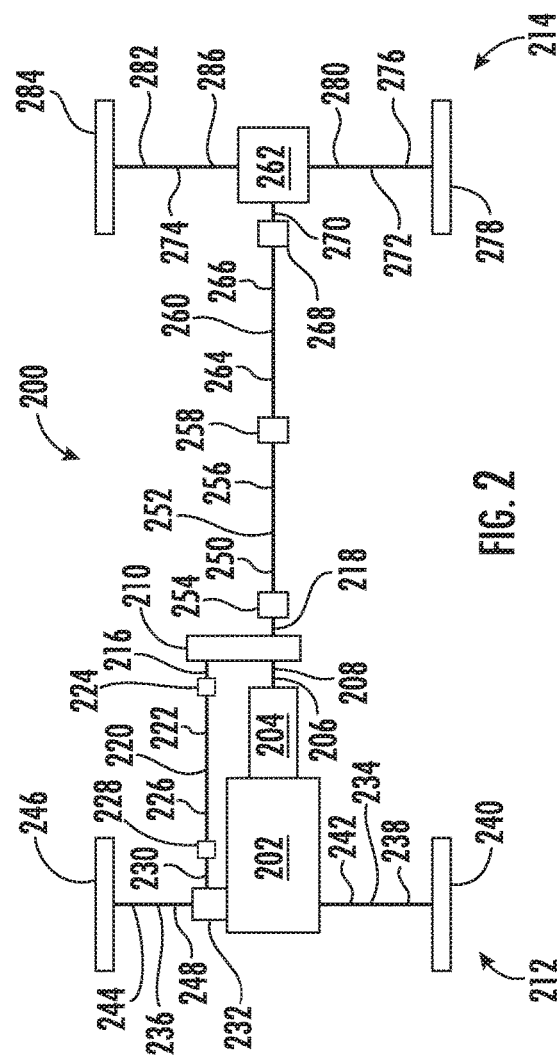

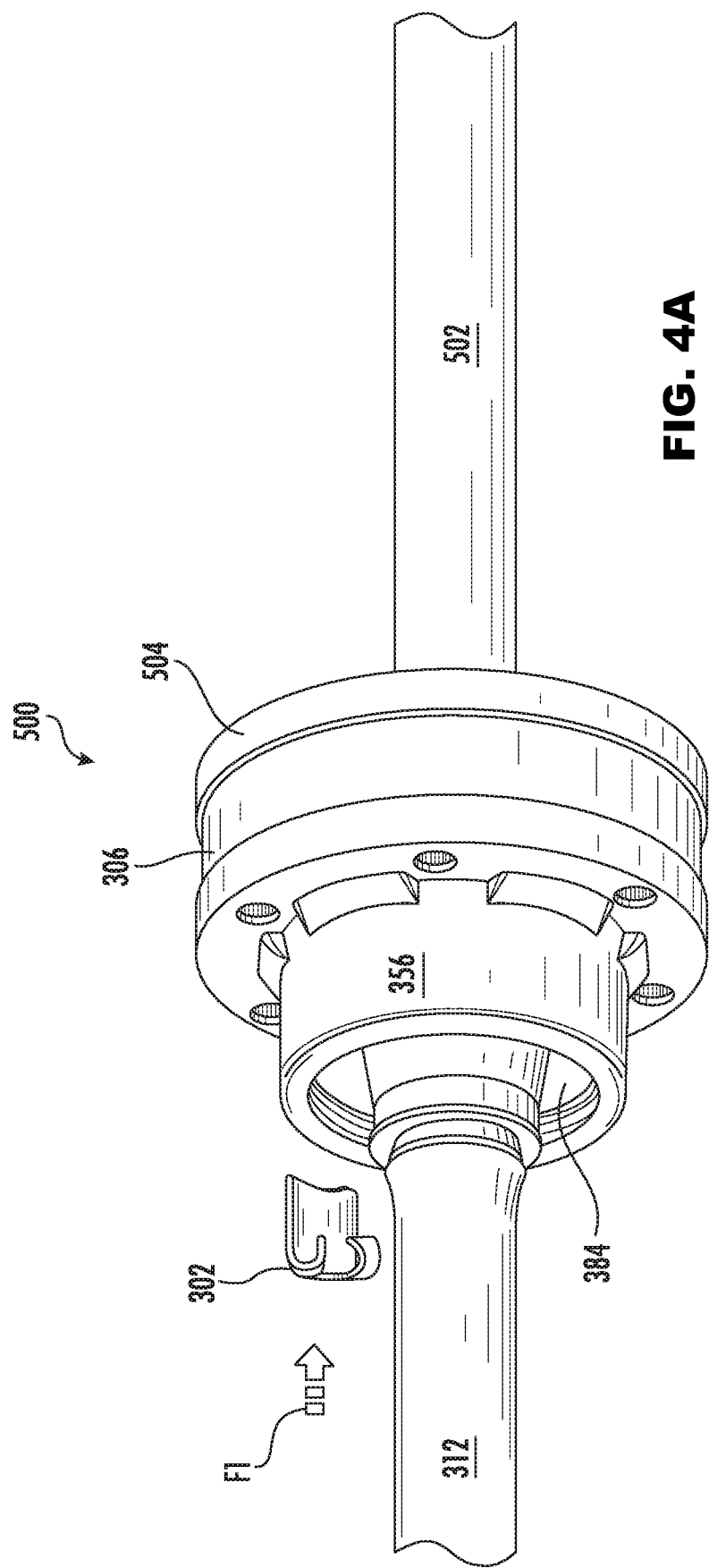

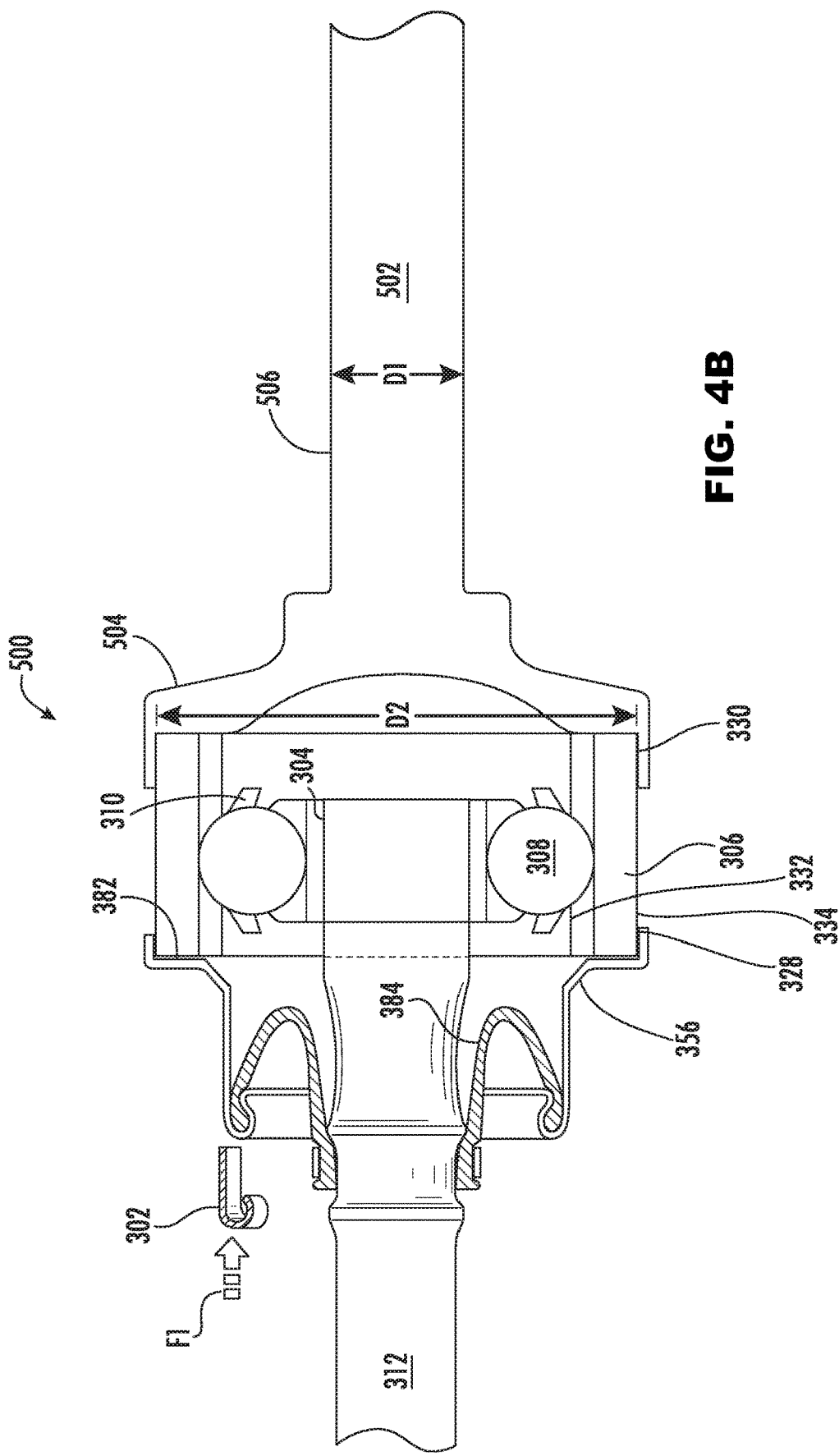

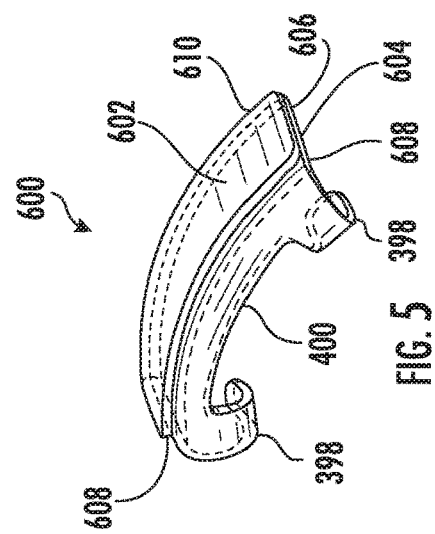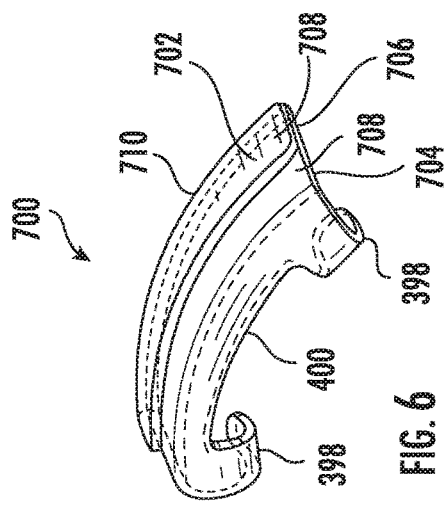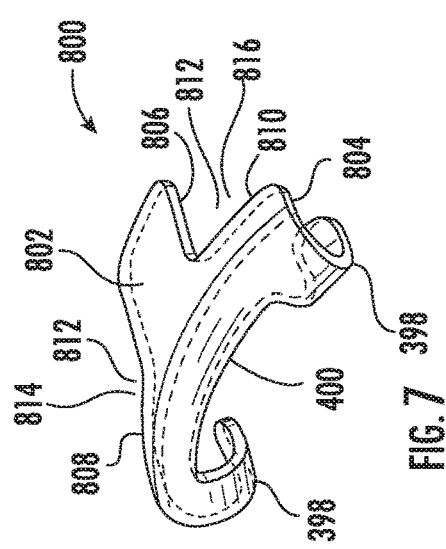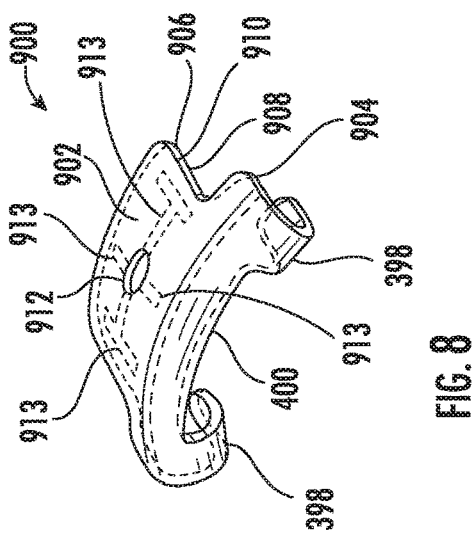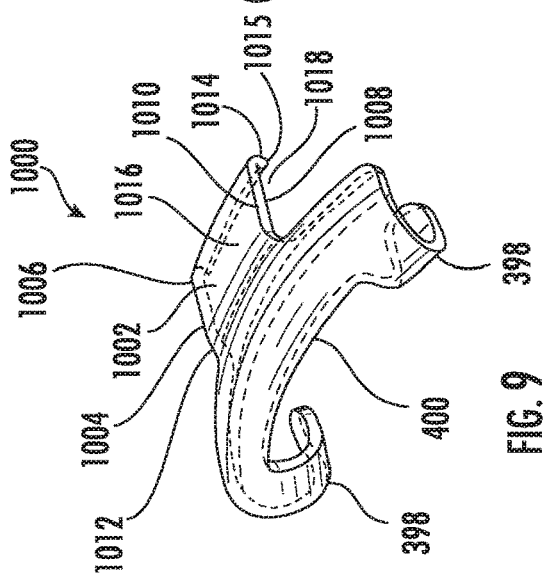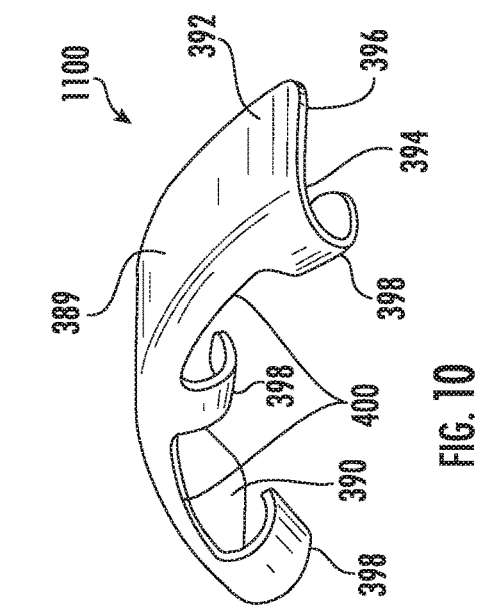

CORRECTING AN IMBALANCE IN A ROTATING SHAFT

CROSS-REFERENCE TO RELATED APPLICATIONS

The present application is a U.S. National Phase of International Application No. PCT/US2019/022041, entitled "CORRECTING AN IMBALANCE IN A ROTATING SHAFT", and filed on Mar. 13, 2019. International Application No. PCT/US2019/022041 claims priority to U.S. Provisional Patent Application No. 62/647,276, entitled "CORRECTING AN IMBALANCE IN A ROTATING SHAFT", and filed on Mar. 23, 2018. The entire contents of each of the above-listed applications are hereby incorporated by reference for all purposes.

TECHNICAL FIELD

The present disclosure related to an apparatus for correcting an imbalance in a rotating shaft along with a method for correcting the imbalance in the rotating shaft.

BACKGROUND AND SUMMARY

The conventional method of correcting an imbalance in a rotating shaft requires that attachment of one or more balancing elements to an outer surface of the shaft. This is done to reduce the amount of noise, vibration and/or harshness experienced by an operator and/or one or more passengers of a vehicle when in operation.

Typically, before the one or more balancing elements are attached to the outer surface of the shaft, an amount of material needs to be removed from the outer surface of the shaft in a in order to ensure a secure attachment of the one or more balancing elements to the shaft. As a result, this requires the use of additional machinery and manufacturing processes that increases the overall costs associates with the manufacture of the rotating shaft.

When correcting an imbalance in a rotating shaft, the radial distance from the center of the rotating shaft to the outermost surface of the balancing element is directly proportional to the amount of balancing element needed to correct the imbalance in the shaft. This can clearly be seen by referencing the below provided shaft balancing equation.

Imbalance=(Mass Balancing Element)×(Radius)

Typically, solid shafts are used when a hollow tubular shaft is unfeasible for use in that location. These solid shafts typically have a smaller outer diameter than a hollow tubular shaft. As a result, the size of the balancing element needed to correct an imbalance in a solid rotating shaft will be greater than the size of the balancing element needed to correct the same imbalance in a hollow tubular rotating shaft. This creates several issues when trying to balance a solid rotating shaft. In particular, the one or more balancing elements needed to correct an imbalance in a solid rotating shaft are bulky and therefore more expensive to manufacture.

Conventionally, the one or more balancing elements are attached to the outer surface of the shaft by using one or more welding processes which takes time and requires additional manufacturing equipment. Additionally, because the one or more balancing elements need to be thicker when balancing a solid shaft, manufactures are unable to use conventional resistance welding techniques when attaching the one or more balancing elements to the outer surface of the shaft. This is due to the insufficient transmission of electricity through the thicker balancing element to the shaft. As a result, alternative welding processes need to be used which tend to weaken the shaft around the location of the balancing element due to the heat affected zone that is characteristic to those welding processes. This can result in a reduction in the overall life and durability of the shaft and the attachment process itself can create an imbalance in the shaft.

It would therefore be advantageous develop a method and apparatus for correcting an imbalance in a rotating shaft, such as a solid shaft and/or a hollow tubular shaft, that is cost efficient, easy to perform and provides for easy attachment, removal and/or re-attachment of the balancing elements. Additionally, it would be advantageous to develop a method and apparatus for correcting an imbalance in a rotating shaft that aids in increasing the overall life and durability of the shaft.

An apparatus for correcting an imbalance in a rotating shaft along with a method for correcting the imbalance in a rotating shaft identified. The joint assembly includes a first joint member that is drivingly connected to at least a portion of second joint member via one or more torque transmission elements. At least a portion of a first shaft is drivingly connected to at least a portion of a first joint member and at least a portion of a second shaft is drivingly connected to at least a portion of a second end portion of the second joint member. A boot can is connected to at least a portion of a first end portion of the second joint member and one or more balancing elements are attached to at least a portion of the boot can.

According to an aspect of the disclosure, the joint assembly may be a constant velocity joint assembly, a homokinetic joint, a CV joint, a plunging constant velocity joint, a direct pinion mount constant velocity joint, a plunging cross-groove sliding ball type constant velocity joint, a tripod type constant velocity joint or a fixed non-plunging type constant velocity joint.

According to any of the previous aspects of the disclosure, the first shaft may be solid, substantially solid or hollow and the second shaft may be solid, substantially solid or hollow.

According to any of the previous aspects of the disclosure, a first end portion of the boot may further comprises a substantially hook-shaped portion and at least a portion of a second end portion of the boot can may be connected to at least a portion of the first end portion of the second joint member.

According to any of the previous aspects of the disclosure, an intermediate portion of the boot can may include a substantially cylindrical or substantially conical portion.

According to any of the previous aspects of the disclosure, a first end of the boot can may further include a radially inward extending annular lip portion.

According to any of the previous aspects of the disclosure, the one or more balancing elements has a body portion having a first end portion, a second end portion, an inner surface and an outer surface, where one or more retention members extend outboard from at least a portion of the first end portion of the base portion of the one or more balancing elements, and the one or more retention members have a shape that is complementary to the substantially hook-shaped portion of the boot can.

According to any of the previous aspects of the disclosure, where the one or more retention members of the one or more balancing elements may be elastically deformed by the substantially hook-shaped portion of the boot can to attach the one or more balancing elements to the boot can, or the one or more retention members may be plastically deformed around at least a portion of the substantially hook-shaped portion of the boot can to attach the one or more balancing elements to the boot can.

According to any of the previous aspects of the disclosure, where at least a portion of the one or more retention members are may be in direct contact with at least a portion the radially inward extending annular lip portion of the boot can.

According to any of the previous aspects of the disclosure, where the body portion of the one or more balancing elements may have one or more layers made of one or more materials.

According to any of the previous aspects of the disclosure, where the one or more layers of the one or more balancing elements may have substantially the same shape or different shapes.

According to any of the previous aspects of the disclosure, where the body portion of the one or more balancing elements may have one or more truncated portions.

According to any of the previous aspects of the disclosure, where the body portion of the one or more balancing elements may have one or more balancing element apertures extending from the inner surface to the outer surface of the body portion.

According to any of the previous aspects of the disclosure, where the inner surface of the body portion of the one or more balancing elements may have one or more grooves therein.

According to any of the previous aspects of the disclosure, where the one or more grooves in the inner surface of the body portion of the one or more balancing elements may be in fluid communication with at least a portion of the one or more balancing element apertures.

According to any of the previous aspects of the disclosure, where at least a portion of the body portion of the one or more balancing elements may be fixedly secured to the substantially cylindrical or substantially conical portion of the boot can by using one or more welds, one or more adhesives and/or one or more epoxies.

According to any of the previous aspects of the disclosure, where the first end portion of the body portion of the one or more balancing elements may have a radially outboard extending portion, where the second end portion of the body portion of the one or more balancing elements may have a radially inboard extending portion, where the body portion may have an axially extending portion that extends between and connects the radially outboard extending portion to the radially inboard extending portion of the body portion of the one or more balancing elements, and where a gap exists between the inner surface of the body portion of the one or more balancing elements and an outer surface of the substantially cylindrical or substantially conical portion of the boot can.

A method of balancing a shaft, including providing a joint assembly having a first joint member drivingly connected to a second joint member by one or more torque transmission elements, where a first shaft is drivingly connected to at least a portion of the first joint member, where at least a portion of a second shaft is drivingly connected to at least a portion of a second end portion of the second joint member, and where at least a portion of a boot can is attached to at least a portion of a first end portion of the second joint member. Once the joint assembly has been provided, the joint assembly is secured within a balancing machine that rotates the joint assembly to identify an imbalance within the first shaft and/or the second shaft. Additionally, the balancing machine is designed in order to determine one or more balancing element locations and one or more balancing element masses needed to cancel out, minimize and/or eliminate the imbalance identified within the first shaft and/or second shaft. One or more balancing elements having the one or more balancing element masses determined are attached to the boot can in the one or more balancing element locations determined on said boot can.

According to any of the previous aspects of the disclosure, further including rotating the joint assembly within the balancing machine after attaching the one or more balancing elements to the boot can, identifying an imbalance within the first shaft and/or the second shaft, and attaching one or more additional balancing elements to said boot can, or removing and re-attaching the one or more balancing elements to the boot can in one or more new balancing element locations determined.

According to any one of the previous aspects of the disclosure, wherein the one or more balancing elements are attached to the boot can using one or more welds, one or more adhesives and/or one or more epoxies.

According to any one of the previous aspects of the disclosure, further including the step of welding at least a portion of the one or more balancing elements to at least a portion of the boot can of the joint assembly in order to fixedly secure at least a portion of said one or more balancing elements to at least a portion of said boot can.

BRIEF DESCRIPTION OF THE FIGURES

The above, as well as other advantages of the present disclosure, will become readily apparent to those skilled in the art from the following detailed description when considered in light of the accompanying drawings in which:

FIG. 1 is a schematic top-plan view of a vehicle having one or more rotating shafts that are balanced according to an embodiment of the disclosure;

FIG. 2 is a schematic top-plan view of another vehicle having one or more rotating shafts that are balanced according to an embodiment of the disclosure;

FIG. 4A is a schematic perspective view of another joint assembly having one or more balancing elements according to an embodiment of the disclosure;

FIG. 4B is a partial cut-away schematic side-view of the joint assembly illustrated in FIG. 4A having one or more balancing elements according to an embodiment of the disclosure;

FIG. 5 is a schematic perspective view of the one or more balancing elements illustrated in FIGS. 3A-4B according to an alternative embodiment of the disclosure;

FIG. 6 is a schematic perspective view of the one or more balancing elements illustrated in FIGS. 3A-5 according to another embodiment of the disclosure;

FIG. 7 is a schematic perspective view of the one or more balancing elements illustrated in FIGS. 3A-6 according to yet another embodiment of the disclosure;

FIG. 8 is a schematic perspective view of the one or more balancing elements illustrated in FIGS. 3A-7 according to still yet another embodiment of the disclosure;

FIG. 9 is a schematic perspective view of the one or more balancing elements illustrated in FIGS. 3A-8 according to a further embodiment of the disclosure; and FIG. 10 is a schematic perspective view of the one or more balancing elements illustrated in FIGS. 3A-9 according to still a further embodiment of the disclosure.

DETAILED DESCRIPTION

Figure 3A:
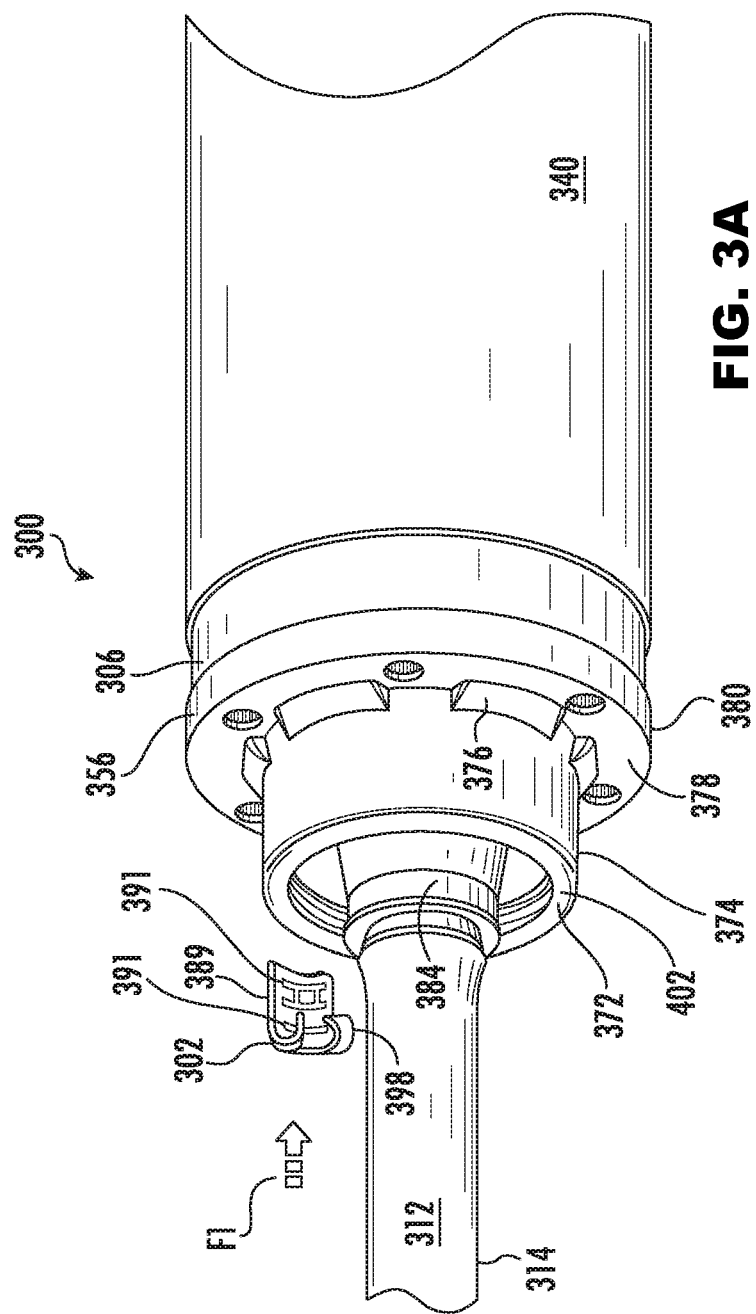
FIG. 3A is a schematic perspective view of a joint assembly having one or more balancing elements according to an embodiment of the disclosure.

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the balancing method and apparatus disclosed herein may be used in automotive, off-road vehicle, all-terrain vehicle, construction, structural, marine, aerospace, locomotive, military, machinery, robotic and/or consumer product applications. Additionally, as a non-limiting example, the balancing method and apparatus disclosed herein may also be used in passenger vehicle, electric vehicle, hybrid vehicle, commercial vehicle, autonomous vehicles, semi-autonomous vehicles and/or heavy vehicle applications.

FIG. 1 is a schematic top-plan view of a vehicle 100 having one or more rotating shafts that are balanced according to an embodiment of the disclosure. The vehicle 100 has an engine 102 which is drivingly connected to a transmission 104. A transmission output shaft 106 is drivingly connected to an end of the transmission 104 opposite the engine 102. The transmission 104 is a power management system which provides controlled application of the rotational power generated by the engine by means of a gear box.

A first end portion 108 of a first propeller shaft 110 may be drivingly connected to an end of the transmission output shaft 106 opposite the transmission 104 via a first coupling assembly 112. As a non-limiting example, the first coupling assembly 112 may be a homokinetic coupling assembly, a constant velocity joint assembly or a CV joint assembly. It is within the scope of this disclosure and as a non-limiting example that the first coupling assembly 112 may include one or balancing elements (not shown) in order to balance the first propeller shaft 110 of the vehicle 100.

As illustrated in FIG. 1 of the disclosure and as a non-limiting example, a second end portion 114 of the first propeller shaft 110 may be drivingly connected to a second coupling assembly 116. As a non-limiting example, the second coupling assembly 116 may be a homokinetic coupling assembly, a constant velocity joint assembly or a CV joint assembly.

Drivingly connected to an end of the second coupling assembly 116, opposite the first propeller shaft 110, is a second propeller shaft 118. The second propeller shaft 118 drivingly connects the transmission 104 to a forward tandem axle system 120 of a tandem axle system 122 having an inter-axle differential 124. As illustrated in FIG. 1 of the disclosure and as a non-limiting example, at least a portion of a first end portion 124 of the second propeller shaft 118 is drivingly connected to an end of the second coupling assembly 116 opposite the first propeller shaft 110. It is within the scope of this disclosure and as a non-limiting example that the second coupling assembly 116 may include one or balancing elements (not shown) in order to balance the first propeller shaft 110 and/or the second propeller shaft 118 of the vehicle 100.

At least a portion of a second end portion 126 of the second propeller shaft 118 may be drivingly connected to an end of a third coupling assembly 128. As a non-limiting example, the third coupling assembly 128 may be a universal joint assembly, a homokinetic coupling assembly, a constant velocity joint assembly or a CV joint assembly. It is within the scope of this disclosure and as a non-limiting example that the third coupling assembly 128 may include one or balancing elements (not shown) in order to balance the second propeller shaft 118 of the vehicle 100.

Drivingly connected to an end of the third coupling assembly 128, opposite the second propeller shaft 118, is an end of a forward tandem axle system input shaft 130. An end of the forward tandem axle system input shaft 130, opposite the second propeller shaft 118, is drivingly connected to at least a portion of the inter-axle differential 124 of the forward tandem axle system 120. As a non-limiting example, the forward tandem axle system input shaft 130 may be an inter-axle differential input shaft, a coupling shaft, stub shaft or an inter-axle differential pinion shaft. The inter-axle differential 124 is a device that divides the rotational power generated by the engine 104 between the axles in a vehicle 100. The rotational power is transmitted through the forward tandem axle system 120 as described in more detail below.

As illustrated in FIG. 1 of the disclosure and as a non-limiting example, the inter-axle differential 124 is drivingly connected to a forward tandem axle differential 132 and a forward tandem axle system output shaft 134. The forward tandem axle differential 132 is a set of gears that allows the outer drive wheel(s) of a wheeled vehicle to rotate at a faster rate than the inner drive wheel(s).

The forward tandem axle system 120 further includes a first forward tandem axle half shaft 136 and a second front tandem axle half shaft 138. The first forward tandem axle half shaft 136 extends substantially perpendicular to the forward tandem axle system input shaft 130. At least a portion of a first end portion 140 of the first forward tandem axle half shaft 136 is drivingly connected to a first forward tandem axle wheel assembly 142 and at least a portion of a second end portion 144 of the first forward tandem axle half shaft 136 is drivingly connected to an end of the forward tandem axle differential 132. As a non-limiting example, the second end portion 144 of the first forward tandem axle half shaft 136 may be drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 130 is the second front tandem axle half shaft 138. At least a portion of a first end portion 146 of the second forward tandem axle half shaft 138 is drivingly connected to a second forward tandem axle wheel assembly 148. At least a portion of a second end portion 150 of the second forward tandem axle half shaft 138 is drivingly connected to an end of the forward tandem axle differential 132 opposite the first forward tandem axle half shaft 136. As a non-limiting example, the second end portion 150 of the second forward tandem axle half shaft 138 may be drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 134 is drivingly connected to a side of the inter-axle differential 124 opposite the second propeller shaft 118. An end of the forward tandem axle system output shaft 134, opposite the inter-axle differential 124, may be drivingly connected to at least a portion of a first end portion 152 of a third propeller shaft 154 via a fourth coupling assembly 156. As a non-limiting example, the fourth coupling assembly 156 may be a homokinetic coupling assembly, a constant velocity joint assembly or a CV joint assembly. It is within the scope of this disclosure and as a non-limiting example that the fourth coupling assembly 156 may include one or balancing elements (not shown) in order to balance the third propeller shaft 154 of the vehicle 100.

At least a portion of a second end portion 158 of the third propeller shaft 154 may be drivingly connected to a fourth propeller shaft 160 via a fifth coupling assembly 162. As a non-limiting example, the fifth coupling assembly 162 may be a homokinetic coupling assembly, a constant velocity joint assembly or a CV joint assembly. It is within the scope of this disclosure and as a non-limiting example that the fifth coupling assembly 162 may include one or balancing elements (not shown) in order to balance the third propeller shaft 154 and/or the fourth propeller shaft 160 of the vehicle 100.

As illustrated in FIG. 1 of the disclosure and as a non-limiting example, at least a portion of a first end portion 164 of the fourth propeller shaft 160 may be drivingly connected to an end of the fifth coupling assembly 162 opposite the third propeller shaft 154. The fourth propeller shaft 160 drivingly connects the inter-axle differential 124 to a rear tandem axle system 166 having a rear tandem axle differential 168.

Additionally, as illustrated in FIG. 1 of the disclosure and as a non-limiting example, at least a portion of a second end portion 170 of the fourth propeller shaft 160 may be drivingly connected to an end of a sixth coupling assembly 172. As a non-limiting example, the sixth coupling assembly 172 may be a homokinetic coupling assembly, a constant velocity joint assembly or a CV joint assembly. It is within the scope of this disclosure and as a non-limiting example that the sixth coupling assembly 172 may include one or balancing elements (not shown) in order to balance the fourth propeller shaft 160 of the vehicle 100.

Drivingly connected to an end of the sixth coupling assembly 172, opposite the fourth propeller shaft 160 is an end of a rear tandem axle system input shaft 174. As a non-limiting example, the rear tandem axle input shaft 174 may be a rear tandem axle differential input shaft, a coupling shaft, stub shaft or a rear tandem axle differential pinion shaft. Drivingly connected to an end of the rear tandem axle input shaft 174, opposite the fourth propeller shaft 160, is the rear tandem axle differential 168. The rear tandem axle differential 168 is a set of gears that allows the outer drive wheel(s) of the wheeled vehicle to rotate at a faster rate that the inner drive wheel(s). The rotational power is transmitted through the rear tandem axle system 166 as described in more detail below.

The rear tandem axle system 166 further includes a first rear tandem axle half shaft 176 and a second rear tandem axle half shaft 178. The first rear tandem axle half shaft 176 extends substantially perpendicular to the rear tandem axle system input shaft 174. At least a portion of a first end portion 180 of the first rear tandem axle half shaft 176 may be drivingly connected to a first rear tandem axle wheel assembly 182 and at least a portion of a second end portion 184 of the first rear tandem axle half shaft 176 may be drivingly connected to an end of the rear tandem axle differential 168. As anon-limiting example, the second end portion 184 of the first rear tandem axle half shaft 176 may be drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 174 is the second forward tandem axle half shaft 178. At least a portion of a first end portion 186 of the second rear tandem axle half shaft 178 may be drivingly connected to a second rear tandem axle wheel assembly 188. Additionally, at least a portion of a second end portion 190 of the second rear tandem axle half shaft 178 may be drivingly connected to an end of the rear tandem axle differential 168 opposite the first rear tandem axle half shaft 176. As a non-limiting example, the second end portion 190 of the second rear tandem axle half shaft 178 may be drivingly connected to a rear tandem axle differential side gear, a separate stub shaft, a separate coupling shaft, a second rear tandem axle differential output shaft and/or a shaft that is formed as part of a rear tandem axle differential side gear.

FIG. 2 is a schematic top-plan view of another vehicle 200 having one or more rotating shafts that are balanced according to an embodiment of the disclosure. The vehicle 200 has an engine 202 which is drivingly connected to a transmission 204. A transmission output shaft 206 is then drivingly connected to an end of the transmission 204 opposite the engine 202. The transmission 204 is a power management system which provides controlled application of the rotational energy generated by the engine 202 by means of a gearbox.

The transmission output shaft 206 is drivingly connected to a transfer case input shaft 208 which in turn is drivingly connected to a transfer case 210. The transfer case 210 is used to transfer the rotational power from the transmission 204 to a front axle system 212 and a rear axle system 214 by utilizing a series of gears and drive shafts. The transfer case 210 further includes a first transfer case output 216 shaft and a second transfer case output shaft 218.

A first propeller shaft 220 extends from the first transfer case output shaft 216 toward the front axle system 212 of the vehicle 200. At least a portion of a first end portion 222 of the first propeller shaft 220 may be drivingly connected to an end of the first transfer case output shaft 216 opposite the transfer case 210 via a first coupling assembly 224. As a non-limiting example, the first coupling assembly 224 may be a homokinetic coupling assembly, a constant velocity joint assembly or a CV joint assembly. It is within the scope of this disclosure and as a non-limiting example that the first coupling assembly 224 may include one or balancing elements (not shown) in order to balance the first propeller shaft 220 of the vehicle 200.

As illustrated in FIG. 2 of the disclosure and as a non-limiting example, at least a portion of a second end portion 226 of the first propeller shaft 220 may be drivingly connected to a second coupling assembly 228. As a non-limiting example, the second coupling assembly 228 may be a homokinetic coupling assembly, a constant velocity joint assembly or a CV joint assembly. It is within the scope of this disclosure and as a non-limiting example that the second coupling assembly 228 may include one or balancing elements (not shown) in order to balance the first propeller shaft 220 of the vehicle 200.

Drivingly connected to an end of the second coupling assembly 228, opposite the first propeller shaft 220, is an end of a front axle system input shaft 230. As a non-limiting example, the front axle system input shaft 230 may be a front axle differential input shaft, a coupling shaft, stub shaft or a front axle differential pinion shaft. Drivingly connected to an end of the front axle system input shaft 230, opposite the first propeller shaft 220, is a front axle differential 232. The front axle differential 232 is a set of gears that allows the outer drive wheel(s) of the wheeled vehicle to rotate at a faster rate that the inner drive wheel(s). The rotational power is transmitted through the front axle system 212 as described in more detail below.

The front axle system 212 further includes a first front axle half shaft 234 and a second front axle half shaft 236. The first front axle half shaft 234 extends substantially perpendicular to the front axle system input shaft 230. At least a portion of a first end portion 238 of the first front axle half shaft 234 may be drivingly connected to a first front axle wheel assembly 240 and at least a portion of a second end portion 242 of the first front axle half shaft 234 may be drivingly connected to an end of the front axle differential 232. As a non-limiting example, the second end portion 242 of the first front axle half shaft 234 may be drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 230 is the second front axle half shaft 236. At least a portion of a first end portion 244 of the second front axle half shaft 236 may be drivingly connected to a second front axle wheel assembly 246. Additionally, at least a portion of a second end portion 248 of the second front axle half shaft 236 may be drivingly connected to an end of the front axle differential 232 opposite the first front axle half shaft 234. As a non-limiting example, the second end portion 248 of the second front axle half shaft 236 may be drivingly connected to a front axle differential side gear, a separate stub shaft, a separate coupling shaft, a second front axle differential output shaft and/or a shaft that is formed as part of a front axle differential side gear.

An end of the second transfer case output shaft 218 is drivingly connected to an end of the transfer case 210 opposite the transfer case input shaft 208. As illustrated in FIG. 2 of the disclosure and as a non-limiting example, at least a portion of a first end portion 250 of a second propeller shaft 252 may be drivingly connected to an end of the second transfer case output shaft 218 opposite the transfer case 210 via a third coupling assembly 254. As non-limiting example, the third coupling assembly 254 may be a homokinetic coupling assembly, a constant velocity joint assembly or a CV joint assembly. It is within the scope of this disclosure and as a non-limiting example that the third coupling assembly 254 may include one or balancing elements (not shown) in order to balance the second propeller shaft 252 of the vehicle 200.

As best seen in FIG. 2 of the disclosure and as a non-limiting example, at least a portion of a second end portion 256 of the second propeller shaft 252 may be drivingly connected to a fourth coupling assembly 258. As a non-limiting example, the fourth coupling assembly 258 may be a homokinetic coupling assembly, a constant velocity joint assembly or a CV joint assembly.

Drivingly connected to an end of the fourth coupling assembly 258, opposite the second propeller shaft 252, is a third propeller shaft 260. The third propeller shaft 260 drivingly connects the transfer case 210 to a rear differential 262 of the rear axle system 214. As illustrated in FIG. 2 of the disclosure and as a non-limiting example, at least a portion of a first end portion 264 of the third propeller shaft 260 is drivingly connected to an end of the fourth coupling assembly 258 opposite the second propeller shaft 252. It is within the scope of this disclosure and as a non-limiting example that the fourth coupling assembly 258 may include one or balancing elements (not shown) in order to balance the second propeller shaft 252 and/or the third propeller shaft 260 of the vehicle 200.

At least a portion of a second end portion 266 of the third propeller shaft 260 is drivingly connected to an end of a fifth coupling assembly 268. As a non-limiting example, the fifth coupling assembly 268 may be a homokinetic coupling assembly, a constant velocity joint assembly or a CV joint assembly. It is within the scope of this disclosure and as a non-limiting example that the fifth coupling assembly 268 may include one or balancing elements (not shown) in order to balance the third propeller shaft 260 of the vehicle 200.

Drivingly connected to an end of the fifth coupling assembly 268, opposite the third propeller shaft 260, is an end of a rear axle system input shaft 270. An end of the rear axle system input shaft 270, opposite the third propeller shaft 260, is drivingly connected to the rear differential 262 of the rear axle system 214. As a non-limiting example, the rear axle system input shaft 270 may be a rear differential input shaft, a coupling shaft, stub shaft or a rear axle differential pinion shaft. The rear axle differential 262 is a set of gears that allows the outer drive wheel(s) of the wheeled vehicle to rotate at a faster rate that the inner drive wheel(s). The rotational power is transmitted through the rear axle system 214 as described in more detail below.

The rear axle system 214 further includes a first rear axle half shaft 272 and a second rear axle half shaft 274. The first rear axle half shaft 272 extends substantially perpendicular to the rear axle system input shaft 270. At least a portion of a first end portion 276 of the first rear axle half shaft 272 may be drivingly connected to a first rear axle wheel assembly 278 and at least a portion of a second end portion 280 of the first rear axle half shaft 272 may be drivingly connected to an end of the rear axle differential 262. As a non-limiting example, the second end portion 280 of the first rear axle half shaft 272 may be drivingly connected to a rear axle differential side gear, a separate stub shaft, a separate coupling shaft, a first rear axle differential output shaft and/or a shaft that is formed as part of a rear axle differential side gear.

Extending substantially perpendicular to the rear axle system input shaft 270 is the second rear axle half shaft 274. At least a portion of a first end portion 282 of the second rear axle half shaft 274 may be drivingly connected to a second rear axle wheel assembly 284. Additionally, at least a portion of a second end portion 286 of the second rear axle half shaft 274 may be drivingly connected to an end of the rear axle differential 262 opposite the first rear axle half shaft 272. As a non-limiting example, the second end portion 286 of the second rear axle half shaft 274 may be drivingly connected to a rear axle differential side gear, a separate stub shaft, a separate coupling shaft, a second rear axle differential output shaft and/or a shaft that is formed as part of a rear axle differential side gear.

Figures 3B, 3C:
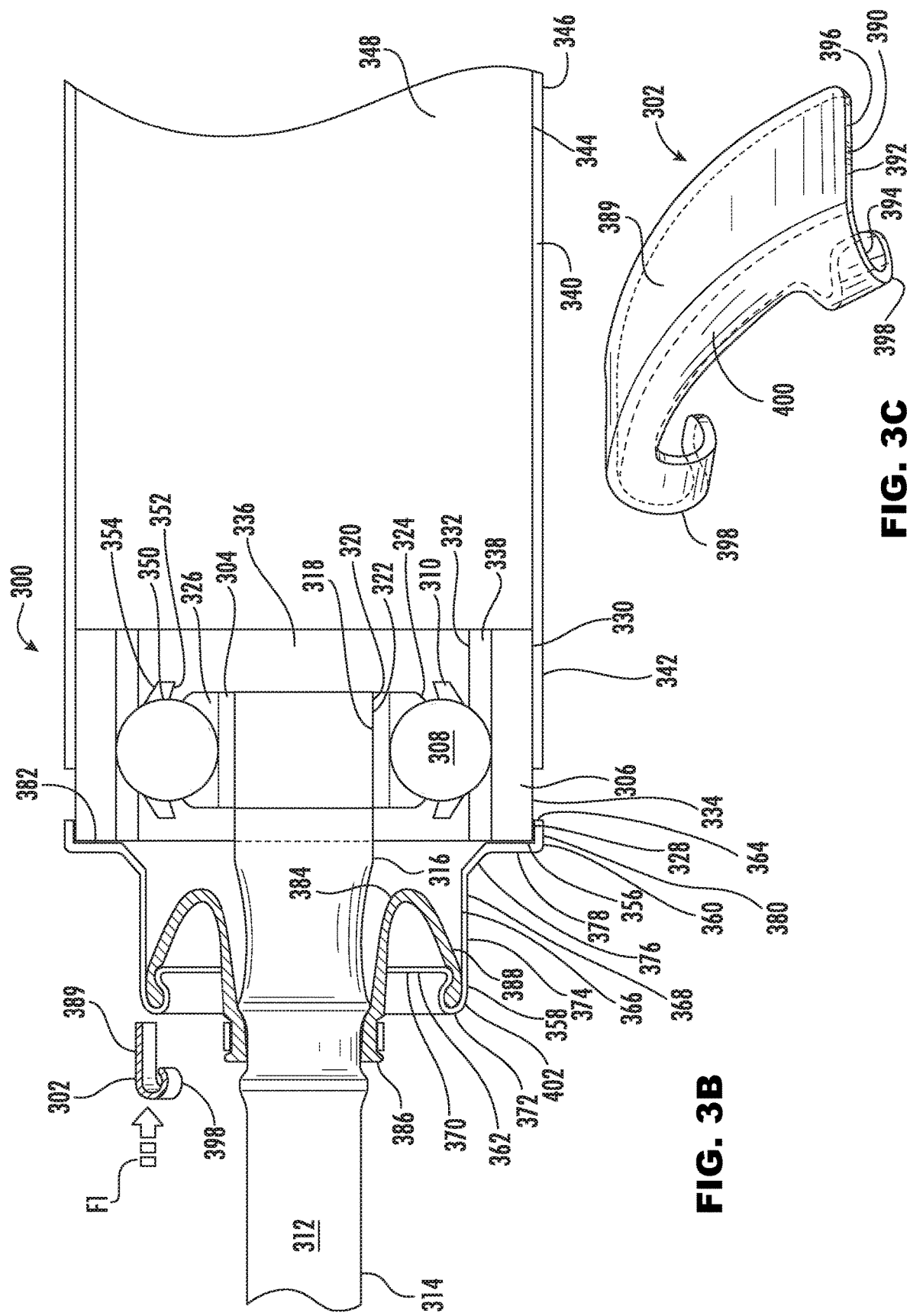
FIG. 3B is a partial cut-away schematic side-view of the joint assembly illustrated in FIG. 3A having one or more balancing elements according to an embodiment of the disclosure.
FIG. 3C is a schematic perspective view of the one or more balancing elements illustrated in FIGS. 3A and 3B according to an embodiment of the disclosure.

FIGS. 3A-3C provide a schematic illustration of a joint assembly 300 having one or more balancing elements 302 according to an embodiment of the disclosure. As best seen in FIG. 3B of the disclosure and as a non-limiting example, the joint assembly 300 has a first joint member 304 that is drivingly connected to at least a portion of a second joint member 306 via one or more torque transmission elements 308 retained within a third joint member 310. It is within the scope of this disclosure and as a non-limiting example that the joint assembly 300 may be a constant velocity joint assembly, a homokinetic joint, a CV joint, a plunging constant velocity joint, a direct pinion mount constant velocity joint, a plunging cross-groove sliding ball type constant velocity joint, a tripod type constant velocity joint or a fixed non-plunging type constant velocity joint.

Drivingly connected to at least a portion of the first joint member 304 is a first shaft 312 having an outer surface 314, a first end portion (not shown) and a second end portion 316. Circumferentially extending from at least a portion of the outer surface 314 of the second end portion 316 of the first shaft 312 is a plurality of axially extending first shaft splines 318. The plurality of axially extending first shaft splines 318 are complementary to and meshingly engaged with a plurality of axially extending first joint member splines 320 circumferentially extending from at least a portion of an inner surface 322 of the first joint member 304. As a non-limiting example that the first shaft may be a substantially solid shaft. It is within the scope of this disclosure and as a non-limiting example that the first shaft may be a stub shaft, an intermediate shaft, a drive sleeve, a prop shaft, a propeller shaft, a drive shaft, an input shaft or an output shaft. As a result, it is to be understood that the first shaft 310 may be a driving shaft that provides an amount of rotational energy to the joint assembly 300 or a driven shaft that transmits the rotational energy from the joint assembly 300 to an adjacent drive-train component (not shown).

Circumferentially extending along at least a portion of an outer surface 324 of the first joint member 304 is one or more first joint member torque transfer element grooves 326. The one or more first joint member torque transfer element grooves 326 are of a size and shape to receive and/or retain at least a portion of the one or more torque transfer elements 308 of the joint assembly 300. It is within the scope of this disclosure and as a non-limiting example that the first joint member 304 may be an inner race.

Disposed radially outboard from at least a portion of the first joint member 304 of the joint assembly 300 is the second joint member 306. As best seen in FIG. 3B of the disclosure and as a non-limiting example, the second joint member 306 has a first end portion 328, a second end portion 330, an inner surface 332 and an outer surface 334. The inner surface 332 and the outer surface 334 of the second joint member 306 defines a hollow portion 336 therein having a size and shape to receive and/or retain at least a portion the first joint member 304, the one or more torque transmission elements 308 and the third joint member 310 of the joint assembly 300. It is within the scope of this disclosure and as a non-limiting example that the second joint member 306 may be an outer race.

Circumferentially extending from at least a portion of the inner surface 332 of the second joint member 306 is one or more second joint member torque transfer element grooves 338. The one or more second joint member torque transfer element grooves 338 have a size and shape to receive and/or retain at least a portion of the one or more torque transfer elements 308 of the joint assembly 300.

Drivingly connected to at least a portion of the second end portion 330 of the second joint member 306 is a second shaft 340 having a first end portion 342, a second end portion (not shown), an inner surface 344 and an outer surface 346. The inner surface 344 and the outer surface 346 of the second shaft 340 defines a hollow portion 348 therein. It is within the scope of this disclosure and as a non-limiting example that at least a portion of the first end portion 342 of the second shaft 340 may be drivingly connected to at least a portion of the second end portion 330 of the second joint member 306 by using one or more welds, one or more mechanical fasteners, one or more adhesives, a splined connection and/or a threaded connection. Additionally, it is within the scope of this disclosure and as a non-limiting example that the second shaft 340 may be a stub shaft, an intermediate shaft, a drive sleeve, a prop shaft, a propeller shaft, a drive shaft, an input shaft or an output shaft. As a result, it is to be understood that the second shaft 340 may be a driving shaft that provides an amount of rotational energy to the joint assembly 300 or a driven shaft that transmits the rotational energy from the joint assembly 300 to an adjacent drive-train component (not shown).

In accordance with the embodiment of the disclosure illustrated in FIG. 3B and as a non-limiting example, at least a portion of the third joint member 310 is interposed between the first joint member 304 and the second joint member 306 of the joint assembly 300. The third joint member 310 has one or more openings 350 extending from an inner surface 352 to an outer surface 354 of the third joint member 310. The one or more openings 350 in the third joint member 310 are of a size and shape to receive and/or retain at least a portion of one or more of the one or more torque transmission elements 308 of the joint assembly 300. It is within the scope of this disclosure and as a non-limiting example that the third joint member 310 may be a cage.

Disposed radially outboard from at least a portion of the first shaft 312 of the joint assembly 300 is a boot can 356 having a first end portion 358, a second end portion 360, a first end 362, a second end 364, an inner surface 366 and an outer surface 368. As best seen in FIG. 3B and as a non-limiting example, at least a portion of the second end portion 360 of the boot can 356 is integrally connected to at least a portion of the first end portion 328 of the second joint member 306 of the joint assembly 300. It is within the scope of this disclosure and as a non-limiting example that the second end portion 360 of the boot can 356 of the joint assembly 300 may be connected to at least a portion of the first end portion 328 of the second joint member 306 by using one or more welds, one or more mechanical fasteners, one or more adhesives, a snap-on connection, a clip-on connection and/or a press-fit type connection.

In accordance with the embodiment of the disclosure illustrated in FIG. 3B and as a non-limiting example, the boot can 356 may include, from the first end 362 to the second end 364 of the boot can 356, a radially inward extending annular lip portion 370, a substantially hook-shaped portion 372, a substantially cylindrical or substantially conical portion 374, an increasing diameter portion 376, a radially outboard extending portion 378 and/or a substantially cylindrical attachment portion 380. It is within the scope of this disclosure and as a non-limiting example that the substantially cylindrical or substantially conical portion 474 may be substantially parallel to the substantially cylindrical attachment portion 380 of the boot can 356. Additionally, it is within the scope of this disclosure and as a non-limiting example that the radially outboard extending portion 378 may be substantially disc-shaped and may extend substantially perpendicular to the substantially cylindrical or substantially conical portion 474 and/or the substantially cylindrical attachment portion 380 of the boot can 356.

As best seen in FIGS. 3A and 3B of the disclosure and as a non-limiting example, when the joint assembly 300 is assembled, at least a portion of the substantially cylindrical attachment portion 380 is in direct contact with at least a portion of the outer surface 334 of the first end portion 328 of the second joint member 306. Additionally, according to the embodiment of the disclosure illustrated in FIGS. 3A and 3B and as a non-limiting example, when the joint assembly 300 is assembled, at least a portion of the radially outboard extending portion 378 is in direct contact with at least a portion of a first side 382 of the second joint member 306. In accordance with the embodiment of the disclosure where the boot can 356 is attached to the second joint member 306 by using one or more mechanical fasteners, at least a portion of the one or more mechanical fasteners will extend through radially outboard extending portion 378 of the boot can 356 and will be received and/or retained within at least a portion of the first end portion 328 of the second joint member 306.

Disposed radially outboard from at least a portion of the first shaft 312 of the joint assembly 300 is a flexible boot member 384 having a first end portion 386 and a second end portion 388. At least a portion of the first end portion 386 of the flexible boot member 384 is sealingly engaged with at least a portion of the outer surface 314 of the first shaft 312 and at least a portion of the second end portion 386 is sealingly engaged with at least a portion of the first end portion 358 of the boot can 356. It is to be understood that the flexible boot member 384 aids in preventing the migration of dirt, debris and/or moisture into the joint assembly 300 and aids in ensuring that the lubricant fluid (not shown) is retained within the joint assembly 300. As a result, the flexible boot member 384 allows the first shaft 312, the first joint member 304, the third joint member 310 and/or the one or more torque transmission elements 308 to articulate relative to the second joint member 306 while still providing a sealing engagement between the boot can 356 and the first shaft 312.

According to the embodiment of the disclosure illustrated in FIGS. 3A and 3B and as a non-limiting example, at least a portion of the second end portion 386 of the flexibly boot member 384 may be received and/or retained within at least a portion of the substantially hook-shaped portion 372 of the first end portion 358 of the boot can 356. It is within the scope of this disclosure and as a non-limiting example that the substantially hook-shaped portion 372 of the boot can 356 may elastically deform to receive and/or retain the second end portion 386 of the flexible boot member 384. Additionally, it is within the scope of this disclosure and as a non-limiting example that the substantially hook-shaped portion 372 may be plastically deformed, or crimped, in order to receive and/or retain at least a portion of the second end portion 386 of the flexible boot member 384.

As best seen in FIGS. 3A and 3B of the disclosure and as a non-limiting example, at least a portion of the one or more balancing elements 302 are attached to at least a portion of the first end portion 358 of the boot can 356 of the joint assembly 300. By attaching one or more of the one or more balancing elements 302 to the boot can 356, the one or more balancing elements 302 may correct an imbalance in the first shaft 312 and/or the second shaft 340 when in operation. It is within the scope of this disclosure and as a non-limiting example that the one or more balancing elements 302 may be made using one or more stamping processes, one or more sintering processes, one or more casting processes, one or more injection molding processes, one or more machining processes, one or more forging processes, one or more additive manufacturing processes and/or by using one or more metal forming processes. Additionally, it is within the scope of this disclosure and as a non-limiting example that at least a portion of the one or more balancing elements 302 may be made of an aluminium alloy, a low carbon steel alloy, a sintered metal alloy, a polymeric composition and/or an engineered plastic composition.

In accordance with the embodiment of the disclosure illustrated in FIG. 3C and as a non-limiting example, the one or more balancing elements 302 have a body portion 389 having an inner surface 390, an outer surface 392, a first end portion 394 and a second end portion 396. When assembled, at least a portion of the inner surface 390 of the body portion 389 of the one or more balancing elements 302 has a shape that is complementary to and is in direct contact with at least a portion of the substantially cylindrical or substantially conical portion 374 of the boot can 356.

Extending from at least a portion of the first end portion 394 of the body portion 389 of the one or more balancing elements 302 is one or more retention members 398. The one or more retention members 398 have a size and shape to receive and/or retain at least a portion of the substantially hook-shaped portion 372 of the boot can 356. In accordance with the embodiment of the disclosure illustrated in FIG. 3C and as a non-limiting example, at least a portion of the one or more retention members 398 extend radially inboard toward the first shaft 312 and axially toward the first, second and/or third joint members 304, 306 and/or 310 of the joint assembly 300. As a result, the one or more retention members 398 may be substantially hook-shaped and have a shape that is complementary to the substantially hook-shaped portion 372 of the boot can 356. It is within the scope of this disclosure and as a non-limiting example that upon application of a pre-determined amount of force F1 to the one or more balancing elements 302, the one or more retention members 398 may be elastically deformed by the substantially hook-shaped portion 372 of the boot can 356 in order to receive and/or retail at least a portion of the substantially hook-shaped portion 372 of the boot can 356. This allows the one or more balancing elements 302 to be attached to the boot can 356 of the joint assembly 300 by using a snap-on, clip-on and/or press-fit type connection. Additionally, it is within the scope of this disclosure and as a non-limiting example that the one or more retention members 398 of the one or more balancing elements 302 may be plastically deformed around at least a portion of the substantially hook-shaped portion 372 of the boot can 356 in order to receive and/or retain at least a portion of the substantially hook-shaped portion 372 of the boot can 356.

According to an embodiment of the disclosure and as a non-limiting example, when assembled, at least a portion of an end of the one or more retention members 398, opposite the body portion 389, may be in direct contact with at least a portion of the radially inward extending annular lip portion 370 of the boot can 356. This aids in ensuring that the one or more balancing elements 302 do not come into direct contact with the flexible boot member 384 which prevents the occurrence of an undesirable amount of wear on the flexible boot member 384 resulting from the one or more balancing elements coming into direct contact with the flexible boot member 384. As a result, it is to be understood that the radially inward extending annular lip portion 370 of the boot can 356 aids in improving the overall life and durability of the flexible boot member 384 and therefore the joint assembly 300.

In accordance with the embodiment illustrated in FIG. 3C of the disclosure and as a non-limiting example, at least a portion of the first end portion 394 of the body portion 389 of the one or more balancing elements 302 may include a radially inward extending lip portion 400. The radially inward extending lip portion 400 of the body portion 389 of the one or more balancing elements 302 may provide a seating surface for at least a portion of the substantially hook-shaped portion 372 of the boot can 356. Additionally, the radially inward extending lip portion 400 may aid in providing structural integrity to the one or more retention members 398 and/or the body portion 389 thereby aiding in improving the overall life and durability of the one or more balancing elements 302. It is within the scope of this disclosure and as a non-limiting example that the radially inward extending lip portion 400 may have a shape that is complementary to an axially outermost portion 402 of the substantially hook-shaped portion 372 of the boot can 356.

By utilizing the one or more balancing elements 302 illustrated in FIGS. 3A-3C to correct an imbalance in the first shaft 312 and/or the second shaft 340, the first and/or second shafts 312 and/or 340 may be balanced without the needs of any welding processes. As previously discussed, the one or more welds typically needed to attach the balancing elements to the outer surface of the shaft tend to weaken the shaft due to the heat affected zone of the one or more welds. Additionally, the process of welding the balancing elements to the outer surface of the shaft itself can create and/or contribute to an imbalance within the rotating shaft. Furthermore, in order to ensure a secure attachment of the balancing elements to the outer surface of the shaft, an amount of material needs to be removed from the shaft in the location where the balancing elements will be attached. All of these factors aid in reducing the overall life and durability of the shafts and aids in increasing the overall costs associated with the shaft. As a result, it is to be understood that the one or more balancing elements 302 described and illustrated herein eliminate the negative and harmful effects associated with removing material from the shaft and welding the balancing elements to the outer surface of a rotating shaft. Therefore, the one or more balancing elements 302 aid in increasing the overall life and durability of the first shaft 312, the second shaft 340 and/or the joint assembly 300. Additionally, it is to be understood that the one or more balancing elements 302 described and illustrated herein aid in reducing the overall costs associated with the first and/or second shafts 312 and/or 340 making the joint assembly 300 more cost efficient. Furthermore, it is to be understood that the one or more balancing elements 302 described and illustrated herein allows for the correction of an imbalance in a solid shaft, a substantially solid shaft and/or a hollow tubular shaft.

Additionally, by utilizing the one or more balancing elements 302 in order to correct an imbalance in the first shaft 312 and/or the second shaft 340, it allows for one or more additional shaft balance determination operations to be easily performed. Because the one or more balancing elements 302 may be connected to the boot can 356 by using a snap-on, clip-on and/or a press-fit type connection, it allows for the one or more balancing elements 302 to be quickly and easily connected, removed and/or re-connected to the boot can 356 as needed. As a result, it is to be understood that by utilizing the one or more balancing elements 302 to correct an imbalance in the first shaft 312 and/or the second shaft 340, one or more additional shaft balance determination operations may be performed. This aids in ensuring that the one or more balancing elements 302 are in their optimal position(s) needed to cancel out, reduce, minimize and/or eliminate the imbalance(s) identified within the first and/or second shafts 312 and/or 340.

Once the optimal position(s) for the one or more balancing elements 302 have been identified, it is within the scope of this disclosure and as a non-limiting example that the one or more balancing elements 302 may be adhered to the boot can 356. In accordance with this embodiment of the disclosure and as a non-limiting example, one or more adhesives and/or epoxies may be applied to at least a portion of the inner surface 390 of the body portion 389 of the one or more balancing elements 302 and/or to at least a portion of the outer surface 368 of the substantially cylindrical or substantially conical portion 374 of the boot can 356. This further aids in ensuring that the one or more balancing elements 302 are retained in their optimal position(s) determined when in operation. It is within the scope of this disclosure and as a non-limiting example that the inner surface 390 of the body portion 389 of the one or more balancing elements 302 may include one or more grooves 391 having a size and shape to receive at least a portion of the one or more adhesives and/or epoxies used to fixedly secure the one or more balancing elements 302 in their optimal position(s). As illustrated in FIG. 3A of the disclosure and as a non-limiting example, the one or more grooves 391 in the inner surface 390 of the body portion 389 of the one or more balancing elements 302 may, or may not, be in fluid communication with each other.

According to an embodiment of the disclosure and as a non-limiting example, at least a portion of the one or more balancing elements 302 may be fixedly secured to at least a portion of the boot can 356 by using one or more welds. This will aid in ensuring that the one or more balancing elements 302 are properly secured to at least a portion of the boot can 356 such that the one or more balancing elements 302 do not become detached from the joint assembly 300 unintentionally when in operation. As a result, this allows the one or more balancing elements 302 to correct an imbalance without experiencing the negative effects associated with welding one or more balancing elements to the outer surface of the shaft. It is within the scope of this disclosure and as a non-limiting example that the weld used to attach the one or more balancing elements 900 to the boot can 356 may be a MIG weld, a TIG weld, a spot weld, an energy beam weld, a laser weld, an electron beam weld, an ultrasonic weld, a magnetic pulse weld, and/or an x-ray weld.

In accordance with an alternative embodiment of the disclosure (not shown) and as a non-limiting example, the one or more retention members 398 may be made of the same or a different material than the body portion 389 of the one or more balancing elements 302. As a result, the material used for the body portion 389 may be optimized for its size, mass, density and/or durability properties and the material of the one or more retention members 398 may be optimized for their deformation, retention and/or durability properties. This allows the one or more balancing elements 302 to be precisely engineered and optimized for their particular application and the type of environment they will be in when in operation.

FIGS. 4A and 4B provide a schematic illustration of a joint assembly 500 having one or more balancing elements 302 according to an embodiment of the disclosure. The joint assembly illustrated in FIGS. 4A and 4B is the same as the joint assembly 300 illustrated in FIGS. 3A and 3B, except where specifically noted below. As illustrated in FIGS. 4A and 4B of the disclosure and as a non-limiting example, the joint assembly 500 does not include the second shaft 340 illustrated in FIGS. 3A and 3B.

In accordance with the embodiment of the disclosure illustrated in FIGS. 4A and 4B and as a non-limiting example, the joint assembly 500 includes a second shaft 502 having a first end portion 504, a second end portion (not shown) and an intermediate portion 506 interposed between the first end portion 504 and the second end portion (not shown). As best seen in FIG. 4B and as a non-limiting example, at least a portion of the first end portion 504 of the second shaft 502 is drivingly connected to at least a portion of the second end portion 330 of the second joint member 306 of the joint assembly 500. It is within the scope of this disclosure and as a non-limiting example that the second shaft 502 may be connected to the second joint member 306 by using one or more welds, one or more mechanical fasteners, one or more adhesives, a spline connection and/or a threaded connection. Additionally, it is within the scope of this disclosure and as a non-limiting example that the second shaft 502 may be a stub shaft, an intermediate shaft, a drive sleeve, a prop shaft, a propeller shaft, a drive shaft, an input shaft or an output shaft. As a result, it is to be understood that the second shaft 502 may be a driving shaft that provides an amount of rotational energy to the joint assembly 500 or a driven shaft that transmits the rotational energy from the joint assembly 500 to an adjacent drive-train component (not shown).

According to the embodiment of the disclosure illustrated in FIGS. 4A and 4B and as a non-limiting example, the intermediate portion 506 of the second shaft 502 has a diameter D1 and the second joint member 306 has a diameter D2. It is within the scope of this disclosure and as a non-limiting example that the diameter D1 of the second shaft 502 may be substantially equal to or less than the diameter D2 of the second joint member 306. Additionally, it is within the scope of this disclosure and as a non-limiting example that the second shaft 502 may be substantially solid or solid.

The one or more balancing elements 302 of the joint assembly 500 may be used to cancel out, reduce, minimize and/or eliminate the imbalance(s) identified within the first shaft 312 and/or the second shaft 502.

FIG. 5 is a schematic perspective view of one or more balancing elements 600 according to an alternative embodiment of the disclosure. The one or more balancing elements 600 illustrated in FIG. 5 are the same as the one or more balancing elements 302 illustrated in FIGS. 3A-4B, except where specifically noted below. As a result, it is to be understood that the one or more balancing elements 600 illustrated in FIG. 5 may be used in combination with or in place of the one or more balancing elements 302 illustrated and described in relation to FIGS. 3A-4B in order to balance the shafts 312, 340 and/or 502 of the joint assemblies 300 and/or 500.

As illustrated in FIG. 5 of the disclosure and as a non-limiting example, the one or more balancing elements 600 have a body portion 602 having a first end portion 604, a second end portion 606 and one or more layers 608. At least a portion of the one or more retention members 398 and/or the radially inward extending lip portion 400 extend from at least a portion of the first end portion 604 of the body portion 602 of the one or more balancing elements 600. It is within the scope of this disclosure and as a non-limiting example that the one or more layers 608 of the one or more balancing elements 600 may be of substantially the same size and shape relative to each other.

According to an embodiment of the disclosure and as a non-limiting example, the one or more layers 608 of the body portion 602 may be made by creating one or more folds 610 in the body portion 602 of the one or more balancing elements 600. According to an alternative embodiment of the disclosure (not shown) and as a non-limiting example, each of the one or more layers 608 of the body portion 602 may be made of separate individual components that are stacked or sandwiched on top of one another. As a non-limiting example, the one or more layers 608 of the body portion 602 may be secured to each other by using one or more welds, one or more adhesives, one or more epoxies and/or one or more mechanical fasteners.

It is within the scope of this disclosure and as a non-limiting example that one or more of the one or more layers 608 of the body portion 602 of the one or more balancing elements 600 may be made of the same material as the radially inward extending lip portion 400 and/or the one or more retention members 398 of the one or more balancing elements 600. Additionally, it is within the scope of this disclosure and as a non-limiting example that the one or more layers 608 of the one or more balancing elements 600 may be made of one or more different materials. Furthermore, it is within the scope of this disclosure and as a non-limiting example that the one or more layers 608 of the one or more balancing elements 600 may be made of the same material as the radially inward extending lip portion 400 and/or the one or more retention members 398 of the one or more balancing elements 600. This provides a quick and easy way to selectively increase and/or decrease the overall mass of the one or more balancing elements 600 while utilizing the same attachment and balancing mechanism. As a result, this allows the one or more balancing elements 600 to be precisely engineered, customized and/or calibrated to cancel out, reduce, minimize and/or eliminate the imbalance(s) identified within the one or more of the shafts 312, 340 and/or 502.

FIG. 6 is a schematic perspective view of one or more balancing elements 700 according to another embodiment of the disclosure. The one or more balancing elements 700 illustrated in FIG. 6 are the same as the one or more balancing elements 302 and 600 illustrated in FIGS. 3A-5, except where specifically noted below. As a result, it is to be understood that the one or more balancing elements 700 illustrated in FIG. 6 may be used in combination with or in place of the one or more balancing elements 302 and/or 600 illustrated and described in relation to FIGS. 3A-5 in order to balance the shafts 312, 340 and/or 502 of the joint assemblies 300 and/or 500.

As illustrated in FIG. 6 of the disclosure and as a non-limiting example, the one or more balancing elements 700 have a body portion 702 having a first end portion 704, a second end portion 706 and one or more layers 708. In accordance with the embodiment illustrated in FIG. 6 and as a non-limiting example, one or more of the one or more layers 708 of the one or more balancing elements 700 may have a different size and shape relative to each other.

According to an embodiment of the disclosure and as a non-limiting example, the one or more layers 708 of the body portion 702 may be made by creating one or more folds 710 in the body portion 702 of the one or more balancing elements 700. According to an alternative embodiment of the disclosure (not shown) and as a non-limiting example, each of the one or more layers 708 of the body portion 702 may be made of separate individual components that are stacked or sandwiched on top of one another. As a non-limiting example, the one or more layers 708 of the body portion 702 may be secured to each other by using one or more welds, one or more adhesives, one or more epoxies and/or one or more mechanical fasteners.

It is within the scope of this disclosure and as a non-limiting example that one or more of the one or more layers 708 of the body portion 702 of the one or more balancing elements 700 may be made of the same material as the radially inward extending lip portion 400 and/or the one or more retention members 398 of the one or more balancing elements 700. Additionally, it is within the scope of this disclosure and as a non-limiting example that the one or more layers 708 of the one or more balancing elements 700 may be made of one or more different materials. Furthermore, it is within the scope of this disclosure and as a non-limiting example that the one or more layers 708 of the one or more balancing elements 700 may be made of the same material as the radially inward extending lip portion 400 and/or the one or more retention members 398 of the one or more balancing elements 700. This provides a quick and easy way to selectively increase and/or decrease the overall mass of the one or more balancing elements 700 while utilizing the same attachment and balancing mechanism. As a result, this allows the one or more balancing elements 700 to be precisely engineered, customized and/or calibrated to cancel out, reduce, minimize and/or eliminate the imbalance(s) identified within the one or more of the shafts 312, 340 and/or 502.

FIG. 7 is a schematic perspective view of one or more balancing elements 800 according to yet another embodiment of the disclosure. The one or more balancing elements 800 illustrated in FIG. 7 are the same as the one or more balancing elements 302, 600 and 700 illustrated in FIGS. 3A-6, except where specifically noted below. As a result, it is to be understood that the one or more balancing elements 600 illustrated in FIG. 7 may be used in combination with or in place of the one or more balancing elements 302, 600 and/or 700 illustrated and described in relation to FIGS. 3A-6 in order to balance the shafts 312, 340 and/or 502 of the joint assemblies 300 and/or 500.

As illustrated in FIG. 7 of the disclosure and as a non-limiting example, the one or more balancing elements 800 has a body portion 802 having a first end portion 804, a second end portion 806, a first side portion 808 and a second side portion 810. At least a portion of the one or more retention members 398 and/or the radially inward extending lip portion 400 extend from at least a portion of the first end portion 804 of the body portion 804 of the one or more balancing elements 800.

In accordance with the embodiment of the disclosure illustrated in FIG. 7 and as a non-limiting example, the body portion 802 of the one or more balancing elements 800 may include one or more truncated portions 812. According to the embodiment of the disclosure illustrated in FIG. 7 and as a non-limiting example, the body portion 802 includes a first truncated portion 814 extending through at least a portion of the first side portion 808 and a second truncated portion 816 extending through at least a portion of the second side portion 810. As a result, the first and second truncated portions 814 and 816 of the one or more balancing elements 800 bilaterally truncate the body portion 802. This allows the one or more balancing elements 800 illustrated in FIG. 7 to have a mass that is less than the mass of the one or more balancing elements 302, 600 and 700 illustrated in FIGS. 3A-6 of the disclosure. As a result, this allows the one or more balancing elements 800 to be precisely engineered, customized and/or calibrated to cancel out, reduce, minimize and/or eliminate the imbalance(s) identified within the one or more of the shafts 312, 340 and/or 502.

FIG. 8 is a schematic perspective view of one or more balancing elements 900 according to still yet another embodiment of the disclosure. The one or more balancing elements 900 illustrated in FIG. 8 are the same as the one or more balancing elements 302, 600, 700 and 800 illustrated in FIGS. 3A-7, except where specifically noted below. As a result, it is to be understood that the one or more balancing elements 900 illustrated in FIG. 8 may be used in combination with or in place of the one or more balancing elements 302, 600, 700 and/or 800 illustrated and described in relation to FIGS. 3A-7 in order to balance the shafts 312, 340 and/or 502 of the joint assemblies 300 and/or 500.

As illustrated in FIG. 8 of the disclosure and as a non-limiting example, the one or more balancing elements 900 have a body portion 902 having a first end portion 904, a second end portion 906, an inner surface 908 and an outer surface 910. At least a portion of the one or more retention members 398 and/or the radially inward extending lip portion 400 extend from at least a portion of the first end portion 904 of the body portion 902 of the one or more balancing elements 900.

Extending from the outer surface 910 to the inner surface 908 of the body portion 902 of the one or more balancing elements 900 is one or more balancing element apertures 912. According to an embodiment of the disclosure and as a non-limiting example, the one or more balancing element apertures 912 may be used to reduce the overall mass of the one or more balancing elements 900. As a result, the one or more balancing element apertures 912 may have a size and shape needed to achieve the desired mass for the one or more balancing elements 900. This allows the one or more balancing elements 900 to be precisely engineered, customized and/or calibrated to cancel out, reduce, minimize and/or eliminate the imbalance(s) identified within the one or more of the shafts 312, 340 and/or 502.

In accordance with an alternative embodiment of the disclosure and as a non-limiting example, the one or more balancing element apertures 912 may be used in order to aid in fixedly attaching the body portion 902 to the boot can 356. As a result, the one or more balancing element apertures 912 may be of a size and shape to receive and/or retain at least a portion of the one or more adhesives and/or epoxies used to fixedly attach the body portion 902 to the boot can 356 of the joint assembly 300 and/or 500. This allows the one or more balancing elements 900 to be fixedly secured to the boot can 356 without first being moved thereby ensuring that the one or more balancing elements are retained within their optimal position(s) identified.

FIG. 9 is a schematic perspective view of one or more balancing elements 1000 according to a further embodiment of the disclosure. The one or more balancing elements 1000 illustrated in FIG. 9 are the same as the one or more balancing elements 302, 600, 700 800 and 900 illustrated in FIGS. 3A-8, except where specifically noted below. As a result, it is to be understood that the one or more balancing elements 1000 illustrated in FIG. 9 may be used in combination with or in place of the one or more balancing elements 302, 600, 700, 800 and/or 900 illustrated and described in relation to FIGS. 3A-8 in order to balance the shafts 312, 340 and/or 502 of the joint assemblies 300 and/or 500.

According to a further embodiment of the disclosure and as a non-limiting example, the one or more balancing element apertures 912 may provide a welding location for fixedly securing at least a portion of the one or more balancing elements 900 to at least a portion of the boot can 356. As a result, at least a portion of the one or more balancing element apertures 912 may provide a welding surface that may be bonded to at least a portion of the boot can 356 by using one or more welds. It is within the scope of this disclosure and as a non-limiting example that the weld used to attach the one or more balancing elements 900 to the boot can 356 may be a MIG weld, a TIG weld, a spot weld, an energy beam weld, a laser weld, an electron beam weld, an ultrasonic weld, a magnetic pulse weld, and/or an x-ray weld.

FIG. 9 is a schematic perspective view of one or more balancing elements 1000 according to a further embodiment of the disclosure. The one or more balancing elements 1000 illustrated in FIG. 9 are the same as the one or more balancing elements 302, 600, 700 800 and 900 illustrated in FIGS. 3-8, except where specifically noted below. As a result, it is to be understood that the one or more balancing elements 1000 illustrated in FIG. 9 may be used in combination with or in place of the one or more balancing elements 302, 600, 700, 800 and/or 900 illustrated and described in relation to FIGS. 3-8 in order to balance the shafts 312, 340 and/or 502 of the joint assemblies 300 and/or 500.

As illustrated in FIG. 9 of the disclosure and as a non-limiting example, the one or more balancing elements 1000 have a body portion 1002 having a first end portion 1004, a second end portion 1006, an inner surface 1008 and an outer surface 1010. At least a portion of the one or more retention members 398 and/or the radially inward extending lip portion 400 extend from at least a portion of the first end portion 1004 of the body portion 1002 of the one or more balancing elements 1000.

At least a portion of the first end portion 1004 of the body portion 1002 may include a radially outboard extending portion 1012 and at least a portion of the second end portion 1006 of the body portion 1002 may include one or more radially inboard extending portions 1014 having an end portion 1015. Extending between and connecting the radially outboard extending portion 1012 to the one or more radially inboard extending portions 1014 of the body portion 1002 of the one or more balancing elements 1000 is an axially extending portion 1016. It is within the scope of this disclosure and as a non-limiting example that the axially extending portion 1016 may be angled inward toward the boot can 356 in order to provide a biasing force sufficient to ensure at least a portion of the body portion 1002 remains in contact with at least a portion of the boot can 356 when in operation.

When assembled, the radially outboard extending portion 1012 extends away from the boot can 356 and the one or more radially inboard extending portions 1014 extends toward the boot can 356 until it comes into direct contact with at least a portion of the substantially cylindrical or substantially conical portion 374 of the boot can 356. As a result, a gap 1018 exists between the inner surface 1008 of the body portion 1002 of the one or more balancing elements 1000 and the outer surface 386 of the substantially cylindrical or substantially conical portion 374 of the boot can 356. The gap 1018 is of a size and shape to receive at least a portion of a tool (not shown) in order to aid in the removal of the one or more balancing elements 1000 from the boot can 356. This will facilitate quick and easy removal of the one or more balancing elements 1000 when performing the one or more balancing operations needed to cancel out, reduce, minimize and/or eliminate the imbalance(s) identified within the shafts 312, 340 and/or 502 of the joint assemblies 300 and/or 500.

Additionally, it is within the scope of this disclosure and as a non-limiting example that gap 1018 may be of a size and shape necessary to receive and/or retain at least a portion of the one or more adhesives and/or epoxies used to fixedly attach the body portion 1002 of the one or more balancing elements 1000 to the outer surface 368 of the boot can 356.

In accordance with an embodiment of the disclosure and as a non-limiting example, the end portion 1015 of the one or more radially inboard extending portions 1014 may provide a welding location for fixedly securing at least a portion of the one or more balancing elements 1000 to at least a portion of the boot can 356. As a result, at least a portion of the end portion 1015 of the one or more radially inboard extending portions 1014 may provide a welding surface that may be bonded to at least a portion of the boot can 356 by using one or more welds. This will aid in ensuring that the one or more balancing elements 1000 are properly secured to at least a portion of the boot can 356 such that the one or more balancing elements 1000 do not become detached unintentionally when in operation. It is within the scope of this disclosure and as a non-limiting example that the weld used to attach the one or more balancing elements 900 to the boot can 356 may be a MIG weld, a TIG weld, a spot weld, an energy beam weld, a laser weld, an electron beam weld, an ultrasonic weld, a magnetic pulse weld, and/or an x-ray weld.

FIG. 10 is a perspective view of one or more balancing elements 1100 according to still a further embodiment of the disclosure. The one or more balancing elements 1100 are the same as the one or more balancing elements 302, 600, 700, 800, 900, and 1000 illustrated in FIGS. 3A-9, except where specifically noted below. As a result, it is to be understood that the one or more balancing elements 1100 illustrated in FIG. 10 may be used in combination with or in place of the one or more balancing elements 302, 600, 700, 800, 900 and/or 1000 illustrated and described in relation to FIGS. 3A-9 in order to balance the shafts 312, 340 and/or 502 of the joint assemblies 300 and/or 500.

As illustrated in FIG. 10 of the disclosure and as a non-limiting example, one or more retention members 398 are integrally formed as part of the body portion 389 of the one or more balancing elements 1100. Additionally, in accordance with the embodiment of the disclosure illustrated in FIG. 10 and as a non-limiting example, the one or more balancing elements 1100 have three retention members having a size and shape to receive and/or retain at least a portion of the substantially hook-shaped portion 372 of the boot can 356. It is therefore to be understood that the one or more balancing elements 302, 600, 700, 800, 900, 1000 and/or 1100 may include additional retention members in order to aid in ensuring a strong and durable connection between the one or more retention members 302, 600, 700, 800, 900, 1000 and/or 1100 and the boot can 356.

The present disclosure further relates to a method of correcting an imbalance in a rotating shaft including first providing a joint assembly 300 or 500 having a first joint member 304 that is drivingly connected to a second joint member 306 via one or more torque transmission elements 308. Connected to at least a portion of a first end portion 328 of the second joint member 306 is a boot can 356. At least a portion of a first shaft 312 is drivingly connected to the first joint member 304 and at least a portion of a second shaft 340 or 502 is drivingly connected to at least a portion of a second end portion 330 of the second joint member 306.

The joint assembly 300 or 500 is secured within a balancing machine (not shown). Once within the balancing machine (not shown), the joint assembly 300 or 500 is rotated in order to identify an imbalance within the first shaft 312 and/or the second shaft 340 or 502 of the joint assembly 300 or 500. The balancing machine (not shown) will then determine a balancing element location and balancing element mass needed to cancel out, reduce, minimize and/or eliminate the imbalance(s) identified within the first shaft 312 and/or second shaft 340 or 502.

Once the balancing element location and balancing element mass has been determined, one or more balancing elements 302, 600, 700, 800, 900 and/or 1000 having the pre-determined mass are attached to at least a portion of the boot can 356 in the location(s) identified. After the one or more balancing elements 302, 600, 700, 800, 900 and/or 1000 have been attached to the boot can, the balancing machine (not shown) will rotate the assembly in order to determine if an imbalance still exists within the first shaft 312 and/or the second shaft 340 or 502 of the joint assembly 300 or 500. If an imbalance is identified within the first shaft 312 and/or the second shaft 340 or 502, the balancing machine (not shown) will then determine a balancing element location and/or balancing element mass needed to cancel out, reduce, minimize and/or eliminate the imbalance(s) identified within the first shaft 312 and/or second shaft 340 or 502. One or more additional balancing elements 302, 600, 700, 800, 900 and/or 1000 having the pre-determined mass will then be attached to at least a portion of the boot can 356 in the new location(s) identified or the one or more balancing elements 302, 600, 700, 800, 900 and/or 1000 removed and re-attached to the boot can 356 in the new location(s) identified.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A joint assembly, comprising:
   a first joint member drivingly connected to a second joint member by one or more torque transfer elements;
   a first shaft drivingly connected to at least a portion of said first joint member;
   a second shaft drivingly connected to at least a portion of a second end portion of said second joint member;
   a boot can connected to at least a portion of a first end portion of said second joint member; and
   one or more balancing elements connected to at least a portion of said boot can, wherein a first end portion of said boot can further includes a substantially hook-shaped portion, and wherein said one or more retention members have a shape that is complementary to said substantially hook-shaped portion of said boot can.

2. The joint assembly of claim 1, wherein said joint assembly is a constant velocity joint assembly, a homokinetic joint, a CV joint, a plunging constant velocity joint, a direct pinion mount constant velocity joint, a plunging cross-groove sliding ball type constant velocity joint, a tripod type constant velocity joint or a fixed non-plunging type constant velocity joint.

3. The joint assembly according to claim 1, wherein said first shaft is solid, substantially solid or hollow; and the joint assembly further comprising:
   a second shaft that is solid, substantially solid or hollow.

4. The joint assembly according to claim 1, wherein at least a portion of a second end portion of said boot can is connected to at least a portion of said first end portion of said second joint member.

5. The joint assembly according to claim 1, wherein an intermediate portion of said boot can has a substantially cylindrical or substantially conical portion.

6. The joint assembly according to claim 1, wherein a first end of said boot can further includes a radially inward extending annular lip portion.

7. The joint assembly according to claim 4, wherein said one or more balancing elements have a body portion having a first end portion, a second end portion, an inner surface and an outer surface;
   wherein one or more retention members extend outboard from at least a portion of said first end portion of said body portion of said one or more balancing elements.

8. The joint assembly according to claim 7, wherein said one or more retention members of said one or more balancing elements are elastically deformed by said substantially hook-shaped portion of said boot can to attach said one or more balancing elements to said boot can, or said one or more retention members are plastically deformed around at least a portion of said substantially hook-shaped portion of said boot can to attach said one or more balancing elements to said boot can.

9. The joint assembly according to claim 7, wherein at least a portion of said one or more retention members are in direct contact with at least a portion said radially inward extending annular lip portion of said boot can.

10. The joint assembly according to claim 7, wherein said body portion of said one or more balancing elements has one or more layers made of one or more materials.

11. The joint assembly according to claim 10, wherein said one or more layers of said one or more balancing elements have substantially the same shape or different shapes.

12. The joint assembly according to claim 7, wherein said body portion of said one or more balancing elements has one or more truncated portions.

13. The joint assembly according claim 7, wherein said body portion of said one or more balancing elements have one or more balancing element apertures extending from said inner surface to said outer surface of said body portion.

14. The joint assembly according to claim 13, wherein said inner surface of said body portion of said one or more balancing elements have one or more grooves therein.

15. The joint assembly according to claim 14, wherein said one or more grooves in said inner surface of said body portion of said one or more balancing elements are in fluid communication with at least a portion of said one or more balancing element apertures.

16. The joint assembly according to claim 7, wherein at least a portion of said body portion of said one or more balancing elements are fixedly secured to said substantially cylindrical or substantially conical portion of said boot can by using one or more welds, one or more adhesives and/or one or more epoxies.

17. The joint assembly according to claim 16, wherein said first end portion of said body portion of said one or more balancing elements has a radially outboard extending portion;

wherein said second end portion of said body portion of said one or more balancing elements has a radially inboard extending portion;

wherein an axially extending portion extends between and connects said radially outboard extending portion to said radially inboard extending portion of said body portion of said one or more balancing elements; and wherein a gap exists between said inner surface of said body portion of said one or more balancing elements and an outer surface of said substantially cylindrical or substantially conical portion of said boot can.

18. A method of balancing a shaft, comprising:

providing a joint assembly having a first joint member drivingly connected to a second joint member by one or more torque transmission elements, wherein a first shaft is drivingly connected to at least a portion of said first joint member, wherein at least a portion of a second shaft is drivingly connected to at least a portion of a second end portion of said second joint member, and wherein at least a portion of a boot can is attached to at least a portion of a first end portion of said second joint member, wherein a first end portion of said boot can further includes a substantially hook-shaped portion, and wherein said one or more retention members have a shape that is complementary to said substantially hook-shaped portion of said boot can;

securing said joint assembly within a balancing machine;

rotating said joint assembly within said balancing machine;

identifying an imbalance within said first shaft and/or said second shaft;

determining one or more balancing element locations and one or more balancing element masses needed to cancel out, minimize and/or eliminate said imbalance identified within said first shaft and/or said second shaft; and attaching said hook-shaped portion of said one or more balancing elements having said one or more balancing element masses determined to said substantially hook-shaped portion of said boot can in said one or more balancing element locations determined on said boot can.

19. The method of balancing a shaft of claim 18, further comprising:

rotating said joint assembly within said balancing machine after attaching said one or more balancing elements to said boot can;

identifying an imbalance within said first shaft and/or said second shaft; and attaching one or more additional balancing elements to said boot can, or removing and re-attaching said one or more balancing elements to said boot can in one or more new balancing element locations determined.

20. The method according to claim 18, wherein said one or more balancing elements are attached to said boot can using one or more welds, one or more adhesives and/or one or more epoxies.

21. The method according to claim 18, further comprising:

welding at least a portion of said one or more balancing elements to at least a portion of said boot can of said joint assembly.

\* \* \* \* \*